United States Patent
Yadan

(10) Patent No.: US 9,321,472 B2
(45) Date of Patent: Apr. 26, 2016

(54) CART FOR USE WITH PEDAL-CYCLE OR OTHER TILT-CORNERING VEHICLE

(71) Applicants: AVIHU MAOR YAHLOMI INVESTMENTS LTD, Moshav Yesha (IL); Ofir Yadan, Nir Yafe (IL)

(72) Inventor: Ofir Yadan, Nir Yafe (IL)

(73) Assignee: AVIHU MAOR YAHLOMI INVESTMENTS LTD, Nir Yafe (IL)

(*) Notice: Subject to any disclaimer, the term of this patent is extended or adjusted under 35 U.S.C. 154(b) by 0 days.

(21) Appl. No.: 14/408,967

(22) PCT Filed: Jul. 17, 2013

(86) PCT No.: PCT/IB2013/055869
§ 371 (c)(1),
(2) Date: Dec. 18, 2014

(87) PCT Pub. No.: WO2014/013445
PCT Pub. Date: Jan. 23, 2014

(65) Prior Publication Data
US 2015/0175184 A1    Jun. 25, 2015

Related U.S. Application Data

(60) Provisional application No. 61/672,343, filed on Jul. 17, 2012.

(51) Int. Cl.
*B62B 3/02* (2006.01)
*B62K 5/05* (2013.01)
*B62K 5/10* (2013.01)

(52) U.S. Cl.
CPC ... *B62B 3/02* (2013.01); *B62K 5/05* (2013.01); *B62K 5/10* (2013.01)

(58) Field of Classification Search
None
See application file for complete search history.

(56) References Cited

U.S. PATENT DOCUMENTS

| | | | |
|---|---|---|---|
| 2009/0108555 A1* | 4/2009 | Wilcox | 280/93.51 |
| 2010/0044977 A1* | 2/2010 | Hughes et al. | 280/5.509 |
| 2011/0006498 A1* | 1/2011 | Mercier | 280/124.103 |
| 2013/0168944 A1* | 7/2013 | Bartolozzi et al. | 280/269 |
| 2013/0181420 A1* | 7/2013 | Hsu et al. | 280/93.502 |
| 2014/0312580 A1* | 10/2014 | Gale | 280/5.509 |

FOREIGN PATENT DOCUMENTS

WO    WO 2009059099 A2 *    5/2009    ............... B62D 9/02

* cited by examiner

*Primary Examiner* — Brodie Follman
*Assistant Examiner* — Hilary L Johns
(74) *Attorney, Agent, or Firm* — Mark M. Friedman

(57) ABSTRACT

A cart with a pair of wheels (14) connected via a tilt mechanism (16) on opposing sides of a cart body (12). The cart body is releasably attachable to a frame (99) of a pedal cycle or other tilt-cornering vehicle so that the pair of wheels function as front wheels of a tricycle configuration. When separate from the pedal-cycle, the cart (10, 100, 150, 170, 200) forms a free-standing cart with a tilt lock (18) deployed to lock tilting of cart body (12).

16 Claims, 15 Drawing Sheets

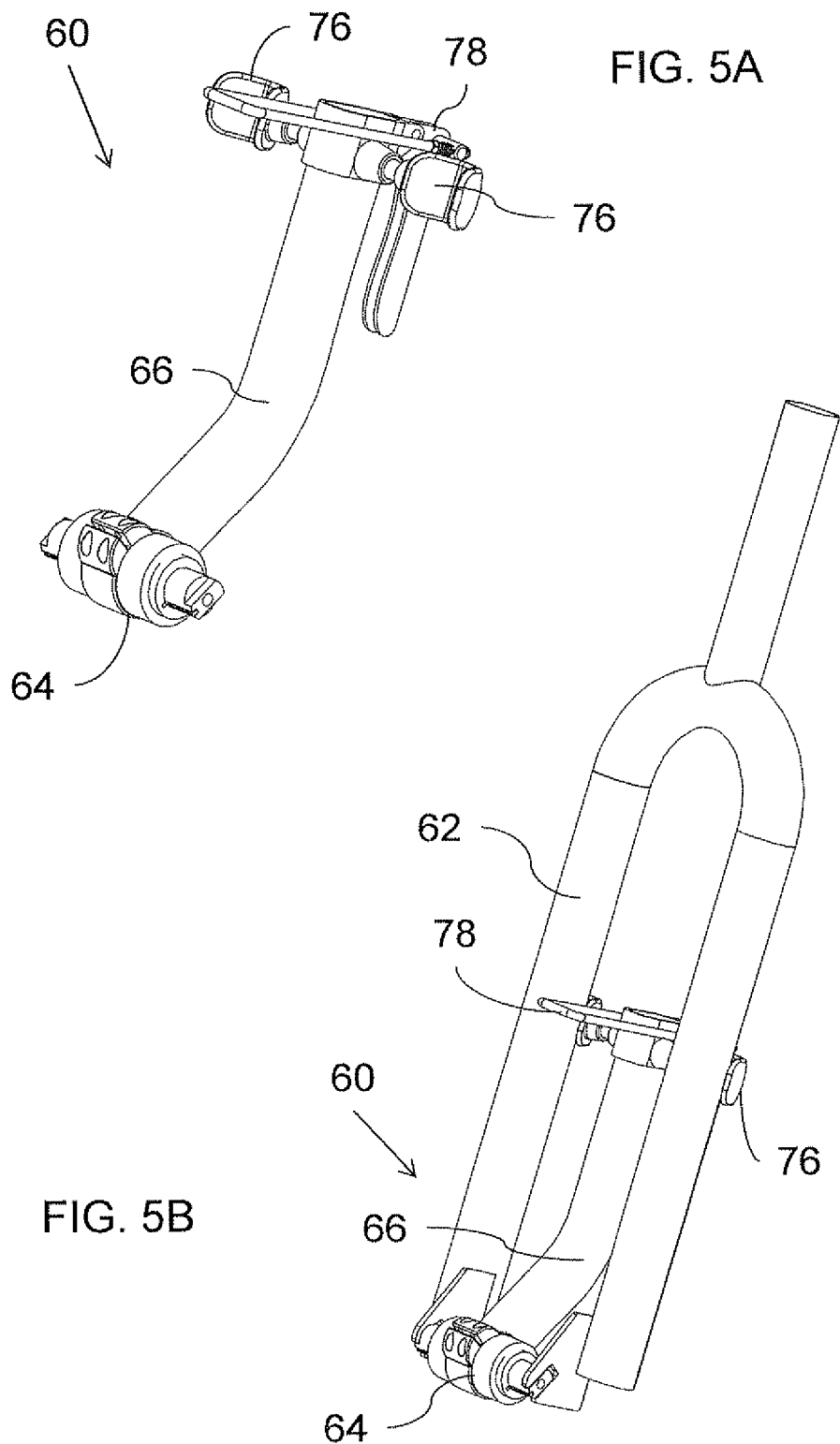

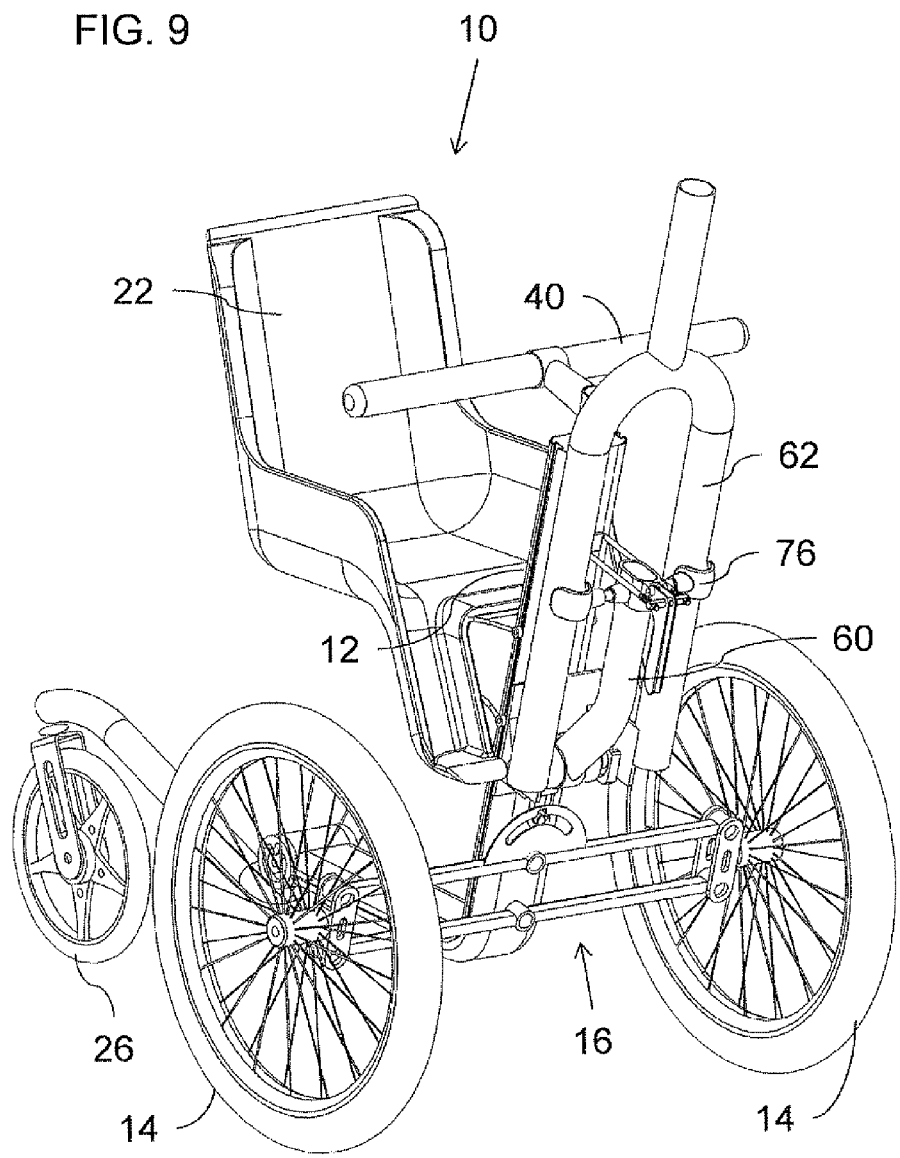

CART FOR USE WITH PEDAL-CYCLE OR OTHER TILT-CORNERING VEHICLE

FIELD AND BACKGROUND OF THE INVENTION

The present invention relates to carts for carrying loads and, in particular, it concerns a cart releasably attachable to a pedal-cycle or other tilt-cornering vehicle to form a tricycle configuration.

It is known to carry various loads on bicycles. The stability of a conventional two-wheel bicycle is often impaired even by relatively small loads. For larger loads, there exist various pedal-driven configurations, sometimes referred to as "freight bicycles" or "cargo bikes", which often have a load-bearing container or platform in front of the handlebars. For enhanced stability, a three-wheel (tricycle) configuration is often preferred. Cargo bikes are typically significantly longer than a conventional bicycle, and less maneuverable.

A conversion kit, commercially available from Bicicletas noomad S.L. (Spain), converts a conventional bicycle into a compact cargo tricycle by permanently replacing the front wheel with a pair of smaller wheels, and provides various options for supporting loads between the wheels. The installation requires use of tools, and the kit components are not usable until assembled on the bicycle frame.

SUMMARY OF THE INVENTION

The present invention is a cart releasably attachable to a pedal-cycle or other tilt-cornering vehicle to form a tricycle configuration.

According to the teachings of an embodiment of the present invention there is provided, a cart for supporting a load above an underlying surface, the cart comprising: (a) a cart body configured for supporting the load; (b) a pair of wheels deployed on opposing sides of the cart body; (c) a tilt mechanism linking between the cart body and the wheels so as to transfer the load on the cart body through the wheels to the underlying surface, the tilt mechanism allowing lateral tilting of the cart body relative to the underlying surface; and (d) a tilt lock associated with the tilt mechanism and selectively deployable to lock tilting of the cart body relative to the underlying surface, wherein the cart body includes connection features forming at least part of a connection arrangement for releasably attaching the cart body to a frame of a tilt-cornering vehicle such that the pair of wheels function as front wheels of a tricycle configuration, and wherein the cart forms a free-standing cart while separate from the tilt-cornering vehicle with the tilt lock deployed to lock tilting of the cart body.

According to a further feature of an embodiment of the present invention, the tilt mechanism is configured such that lateral tilting of the cart body generates a corresponding tilt of each of the wheels.

According to a further feature of an embodiment of the present invention, the tilt mechanism comprises a parallelogram linkage linking between the cart body and the wheels.

According to a further feature of an embodiment of the present invention, there is also provided a third wheel deployable to support the cart together with the pair of wheels as a free-standing cart.

According to a further feature of an embodiment of the present invention, the third wheel is supported relative to the cart body by a retraction mechanism, the retraction mechanism being selectively deployable between a deployed state in which the third wheel supports the cart together with the pair of wheels as a free-standing cart and a retracted state in which the third wheel is removed from the underlying surface for use of the cart attached to a tilt-cornering vehicle.

According to a further feature of an embodiment of the present invention, there is also provided a selectively deployable stand selectively deployable to an extended position in which the stand supports the cart together with the pair of wheels as a free-standing cart.

According to a further feature of an embodiment of the present invention, the cart body comprises a modular mounting arrangement configured for supporting any one of a plurality of accessories.

According to a further feature of an embodiment of the present invention, the plurality of accessories include at least one accessory selected from the group comprising: a child seat; a seat for a physically handicapped person; a shopping basket; a luggage rack; and a container.

According to a further feature of an embodiment of the present invention, the mounting arrangement allows continuous adjustment of a height of attachment of the accessories.

According to a further feature of an embodiment of the present invention, the cart body further comprises a retractable handle selectively deployable to allow pushing of the cart as a free-standing cart.

According to a further feature of an embodiment of the present invention, there is also provided an adapter assembly configured for attachment to a bicycle front fork in place of a front wheel, the adapter assembly cooperating with the connection features of the cart body for releasable attachment of the cart body.

According to a further feature of an embodiment of the present invention, the adapter assembly and the tilt lock are configured such that attachment of the cart body to the adapter is effective to deploy the tilt lock from a locked state to an unlocked state, and detachment of the cart body from the adapter is effective to return the tilt lock to a locked state.

According to a further feature of an embodiment of the present invention, the adapter assembly comprises: (a) a fork-end engagement for attachment to a fork-end of the bicycle front fork; and (b) an arm projecting from the fork-end engagement, the arm being displaceable in an arcuate motion about the fork-end engagement.

According to a further feature of an embodiment of the present invention, the arcuate motion of the arm operates a clamping mechanism of the fork-end engagement for selectively clamping and releasing the connection features of the cart body.

According to a further feature of an embodiment of the present invention, an end of the arm includes at least part of a secondary clamping mechanism configured such that, when the arm assumes a raised position adjacent to the bicycle front fork, the secondary clamping mechanism clamps the cart body to the bicycle front fork.

According to a further feature of an embodiment of the present invention, in a lowered position of the arm, the adapter is configured to serves as a stand for supporting the bicycle front fork above the underlying surface.

BRIEF DESCRIPTION OF THE DRAWINGS

The invention is herein described, by way of example only, with reference to the accompanying drawings, wherein:

FIG. 5A is an isometric view of an adapter for adapting the front fork of a conventional bicycle for use with the cart of FIG. 1;

FIG. 5B is an isometric view showing the adapter of FIG. 5A attached to the front fork of a bicycle;

FIG. 9 is an isometric view showing the cart of FIG. 1 fastened to the front fork of a tilt-cornering vehicle frame, with only the front fork shown for clarity;

DESCRIPTION OF THE PREFERRED EMBODIMENTS

Figure 1:
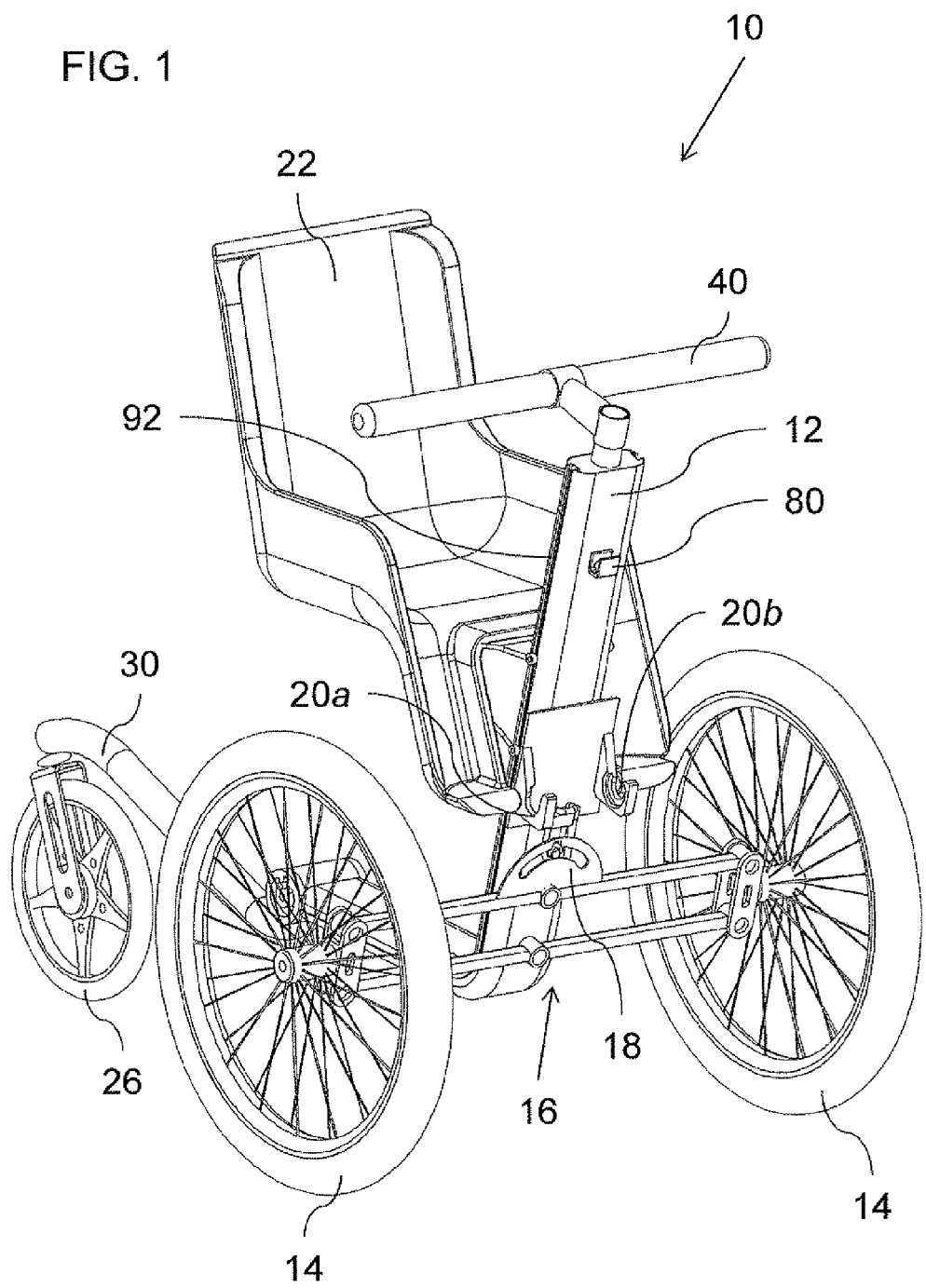
FIG. 1 is an isometric view of a cart, constructed and operative according to an embodiment of the present invention, configured for stand-alone use as a stroller.

The present invention is a cart releasably attachable to a pedal-cycle or other tilt-cornering vehicle to form a tricycle configuration.

The principles and operation of carts according to the present invention may be better understood with reference to the drawings and the accompanying description.

Referring now to the drawings, FIGS. 1-11 show a cart, generally designated 10, constructed and operative according to an embodiment of the present invention, for supporting a load above an underlying surface. Generally speaking, cart 10 includes a cart body 12 configured for supporting the load, a pair of wheels 14 deployed on opposing sides of cart body 12, and a tilt mechanism 16 linking between cart body 12 and wheels 14 so as to transfer the load on the cart body through the wheels to the underlying surface. Tilt mechanism 16 is configured to allow lateral tilting of cart body 12 relative to the underlying surface. A tilt lock 18 associated with tilt mechanism 16 is selectively deployable to lock tilting of cart body 12 relative to the underlying surface.

Cart body includes connection features 20a and 20b that form at least part of a connection arrangement for releasably attaching cart body 12 to a frame 99 of a pedal cycle or other tilt-cornering vehicle such that the pair of wheels function as front wheels of a tricycle configuration, as will be described below with reference to FIGS. 2B and 3A. When separate from the pedal-cycle, cart 10 forms a free-standing cart with tilt lock 18 deployed to lock tilting of cart body 12.

At this stage, it will already be apparent that the cart of the present invention provides highly advantageous properties. While attached to a pedal-cycle, the cart forms of a compact cargo tricycle which can tilt as it corners, thereby providing agility similar to a bicycle with enhanced stability and load-carrying capabilities. The cart can then be detached for stand-alone use, for example, as a stroller or a shopping cart, allowing for example entry into buildings and other areas which may be inaccessible to pedal-cycles. The ability to transition from tricycle mode to cart mode without loading and unloading of the cart provides convenience and flexibility of use in a wide range of applications. The remaining part of the pedal-cycle while parked without cart 10 is lacking front wheels, thereby also making it relatively inconvenient to steal. These and other advantages of the present invention will become clearer from the following description and accompanying drawings.

At this point, it will be helpful to define certain terminology as used herein in the description and claims. The term "cart" is used herein to refer to any small, wheeled vehicle with two or more wheels, typically pushed or pulled by hand. The term thus defined includes, but is not limited to, strollers for children of all ages, wheelchairs, shopping carts and other load-bearing wheeled structures. The word "stroller" is used herein in its common usage in American English, and refers herein collectively to all kinds of wheeled conveyances for infants and children which may be variously referred to as "pushchairs" (UK English), baby carriages, buggies etc.

The term "pedal-cycle" is used herein in the description and claims to refer to bicycles, tricycles and any other pedal-driven wheeled conveyance. The term "tilt-cornering vehicle" is used to include all such pedal-cycles and other vehicles which tilt laterally as they corner, including but not limited to, push-scooters and electric scooters. In one particular subset of embodiments, the cart of the present invention may be used in combination with a conventional bicycle or scooter, having a front fork suited for a single front wheel, by use of a suitable adapter as further detailed below. Alternatively, the cart may be part of a dedicated tricycle design that has a suitable connector built-in to the handlebar steering column. In both cases, the frame to which the cart attaches is referred to as a "pedal-cycle frame" or "tilt-cornering vehicle frame". For convenience, reference will be made in the description below to "pedal-cycle" and "pedal-cycle frame" to exemplify the invention, but it should be noted throughout that the description applies equally to other forms of tilt-cornering vehicles.

When reference is made to "lateral tilting" of the cart body and/or cycle frame, this refers to tilt of the device towards the inside of a turn, i.e., tilting to the side, crossways to the direction of travel of the vehicle.

The terms "retraction" or "retractable" and "extension" or "extendible" are used to refer to any arrangement allowing for extension and retraction of the corresponding element, which may be, for example, through a folding motion or through a telescopic mechanism.

Turning now to the features of cart 10 in more detail, the non-limiting example illustrated in FIGS. 1-3 and 9, cart body 12 is shown supporting a child seat 22, which may be forward facing or rearward facing, and which is provided with suitable safety restraints etc. (not shown). A similar structure may be implemented for a larger seat suitable for a physically disabled adult.

The attachment brackets supporting child seat 22 may advantageously include a general purpose support frame, such as the frame 24 illustrated in the embodiments of FIGS. 12A-12B and 15A-15B below, suitable for supporting a suitcase, shopping bag or another load of any desired type when the child seat is removed. Additionally, or alternatively, cart body 12 may be implemented with modular attachment features allowing attachment of a range of load-bearing structures and/or accessories at a range of different heights relative to the cart body. In the particular non-limiting case illustrated here, cart body 12 if formed from a shaped profile which has T-shaped slots 92 running along its sides, thereby allowing attachment of any suitably designed accessory with complementary clamping features of clamping at any desired height (continuously adjustable) along the slots. Examples of suitable accessories include, but are not limited to, a child seat, a seat for a physically handicapped person, a shopping basket, a luggage rack, and a container of any desired type.

Figure 2A:
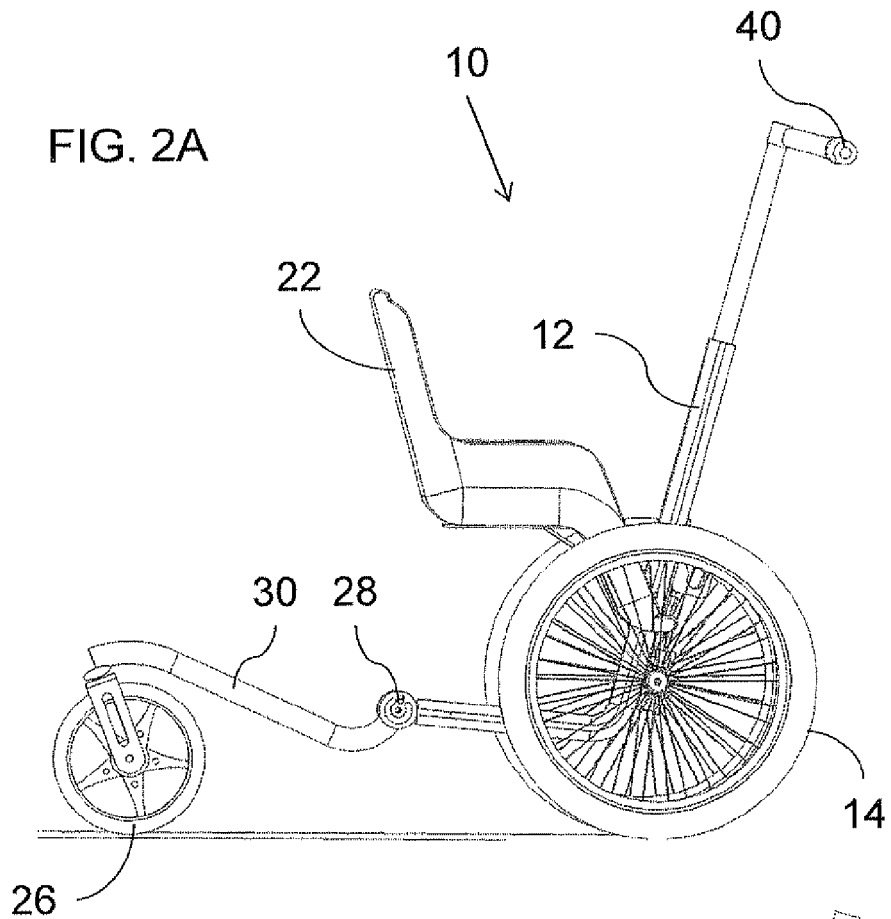
FIG. 2A is a side view of the cart of FIG. 1.
Figure 2B:
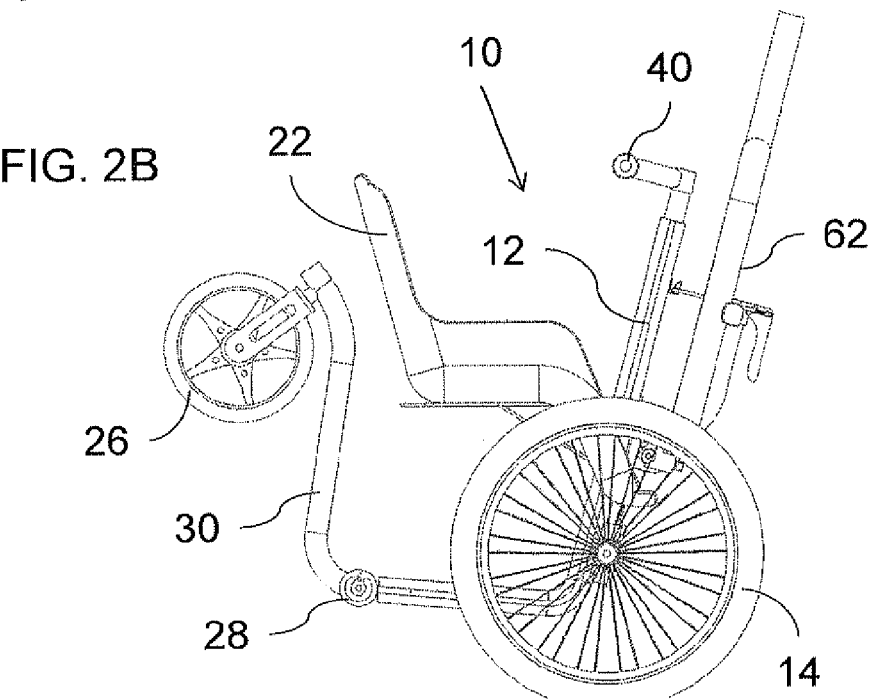
FIG. 2B is a side view of the cart of FIG. 1 attached to a tilt-cornering vehicle frame (only front fork shown here) so as to provide front wheels of a tricycle configuration.
Figure 3A:
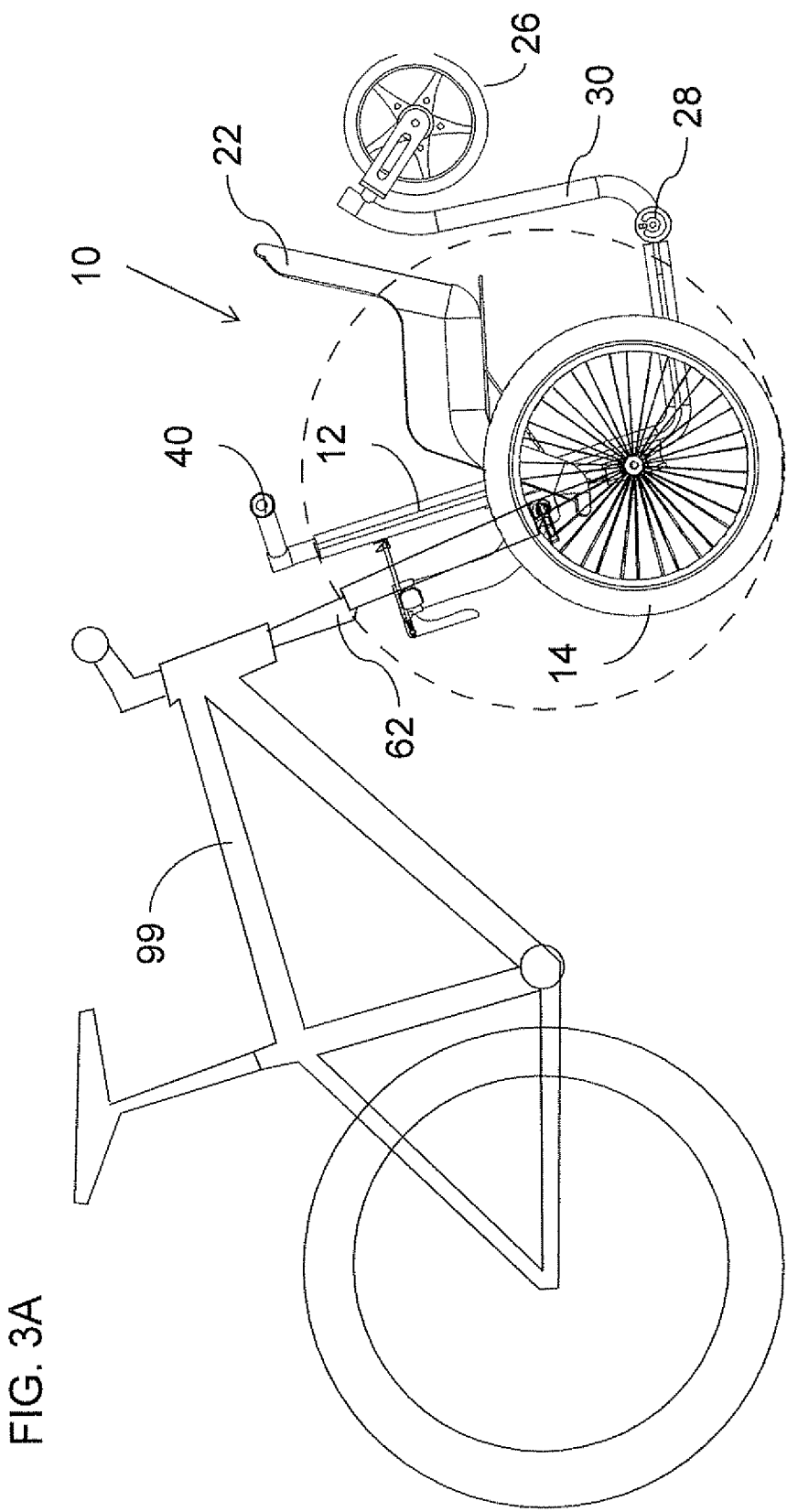
FIG. 3A is a schematic side view showing the tricycle configuration corresponding to FIG. 2B.

To provide stability when used as a free standing cart (e.g., a stroller or a wheelchair), the preferred implementation of cart 10 illustrated here is provided with a third wheel 26 supported relative to cart body 12 by a retraction mechanism that is selectively deployable between a deployed state, as shown in FIGS. 1 and 2A, in which third wheel 26 supports cart 10 together with pair of wheels 14 as a free-standing cart, and a retracted state, as shown in FIGS. 2B and 3A, in which third wheel 26 is removed from the underlying surface for use of the cart attached to the pedal-cycle 99. Clearly, the third wheel need not be a sole third wheel, and may be one of a pair of additional wheels. In certain preferred implementations, the additional wheel(s) may be swivel (caster) wheels.

Figure 10A:
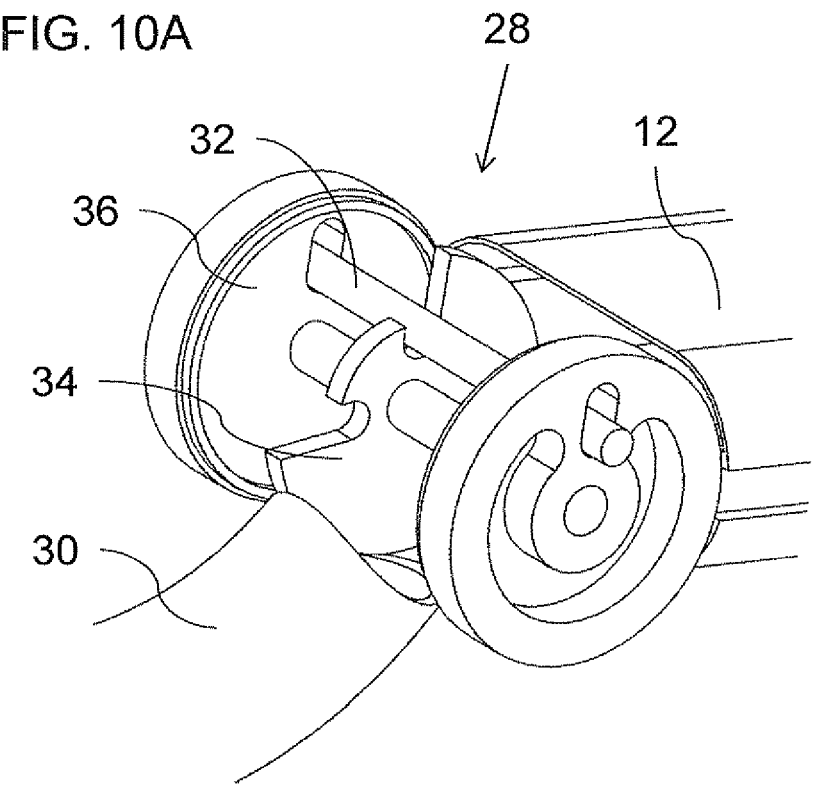
FIG. 10A is a partially cut-away view of a locking hinge from FIG. 2A showing the hinge in a first state corresponding to the deployed state of a third wheel of the cart.
Figure 10B:
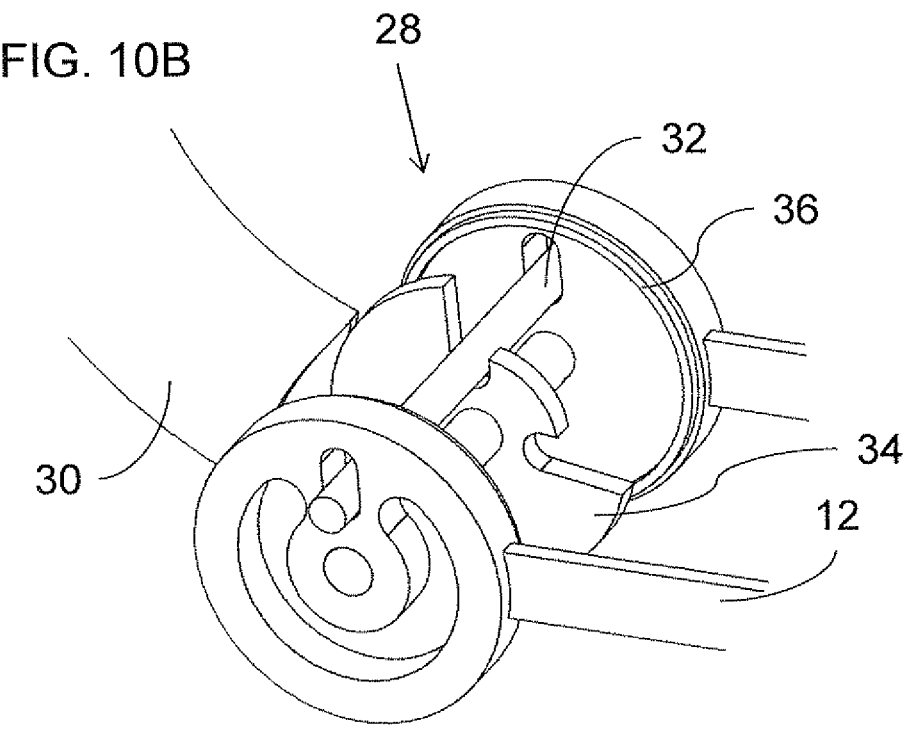
FIG. 10B is a view similar to FIG. 10A showing the hinge in a second state corresponding to the retracted state of the third wheel shown in FIG. 2B.

In the particularly preferred implementation illustrated here, retraction and deployment of third wheel 26 is performed by pivotal or folding motion at a locking hinge 28, about which an arm 30 supporting third wheel 26 pivots. An enlarged and partially cut away view of a particularly preferred but non-limiting example of locking hinge 28 is illustrated in. FIGS. 10A and 10B, where a locking pin 32 is biased radially inwards by a spring arrangement (not shown) to alternately engage one of two locking slots in a slotted disk 34 which is fixed to and moves with arm 30. Locking pin 32 is limited to radial motion by slots formed in end plates 36 which are fixed to cart body 12. Manual displacement of locking pin 32 releases arm 30 from one of its locking slots to allow raising or lowering of the arm between the deployed state and the retracted state, and then springs back to lock arm 30 into the corresponding position. Although illustrated here using pivotal retraction, it will be understood that various other telescopic or otherwise retractable mechanisms may also be used.

Figure 12A:
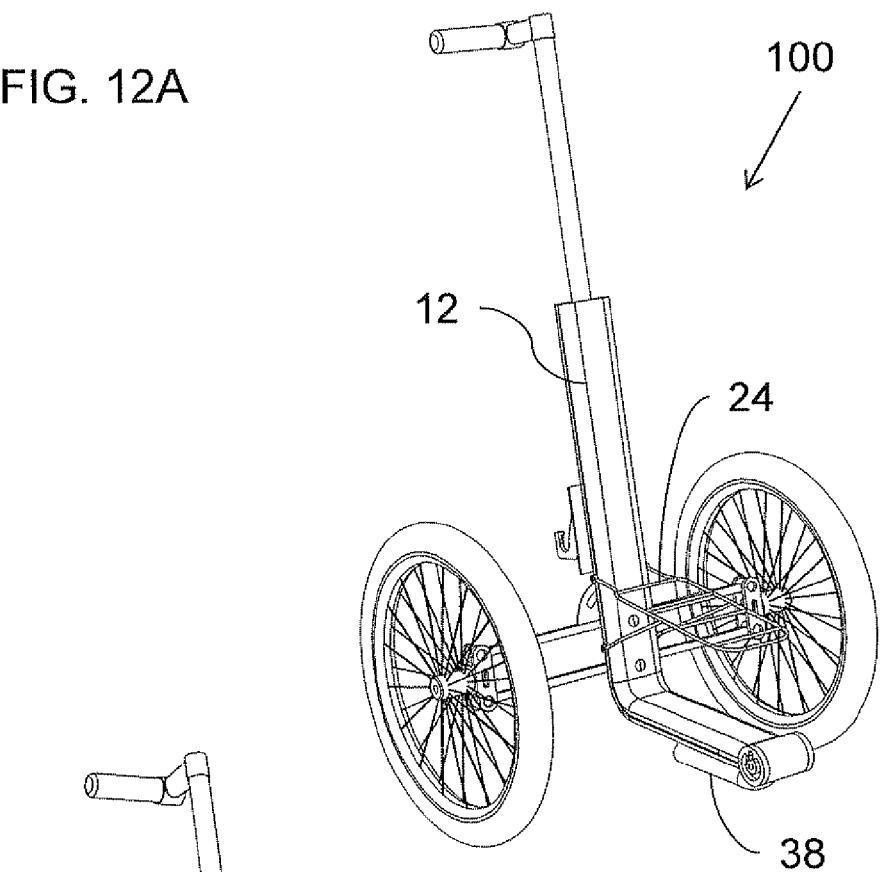
FIGS. 12A and 12B are isometric views of a variant of the cart of FIG. 1 illustrating the cart with a selectively deployable stand illustrated in a retracted and extended position, respectively, in accordance with an embodiment of the invention.
Figure 12B:
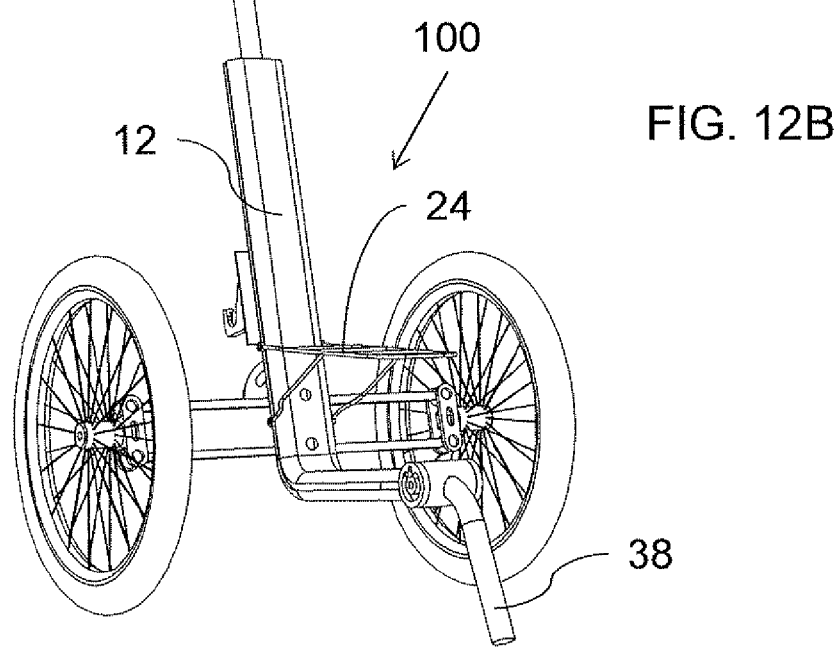

As an alternative to a third wheel, in certain applications, cart 10 is provided with a selectively deployable stand, shown as folding stand 38 in FIGS. 12A-12B. Folding stand 38 is selectively deployable to an extended position (FIG. 12B) in which the stand supports the cart together with pair of wheels 14 as a free-standing cart, and a retracted (folded) position (FIG. 12A) in which stand 38 is clear from the underlying surface to facilitate use of cart 10 as part of a tricycle configuration. Folding stand 38 may be provided with a two-position locking hinge similar to locking hinge 28 described above, or may employ a bistable spring mechanism to facilitate operation of the stand by pushing it towards the desired position with a foot (i.e., a "kickstand").

In order to facilitate manual operation of cart 10 when separate from the pedal-cycle, certain preferred implementations of cart 10 include a handle 40 which may be a single-hand handle or a handlebar type double handle. In order to minimize obstruction when connected to a pedal-cycle, it may be advantageous to implement handle 40 as a retractable handle selectively deployable to allow pushing of the cart as a free-standing cart and retractable into cart body 12 when not in use. FIG. 2A illustrates a deployed/extended state of handle 40 whereas FIGS. 1, 2B and 3A show a retracted state.

Turning now to details of tilt mechanism 16, this allows lateral tilting of at least cart body 12 relative to the underlying surface so as to facilitate banking around curves during riding in the tricycle configuration, i.e., leaning into the curves in a manner similar to a bicycle. One preferred but non-limiting implementation of tilt mechanism 16 will now be described with reference to FIGS. 1, 4A-4B and 16A-16B.

Figure 4A:
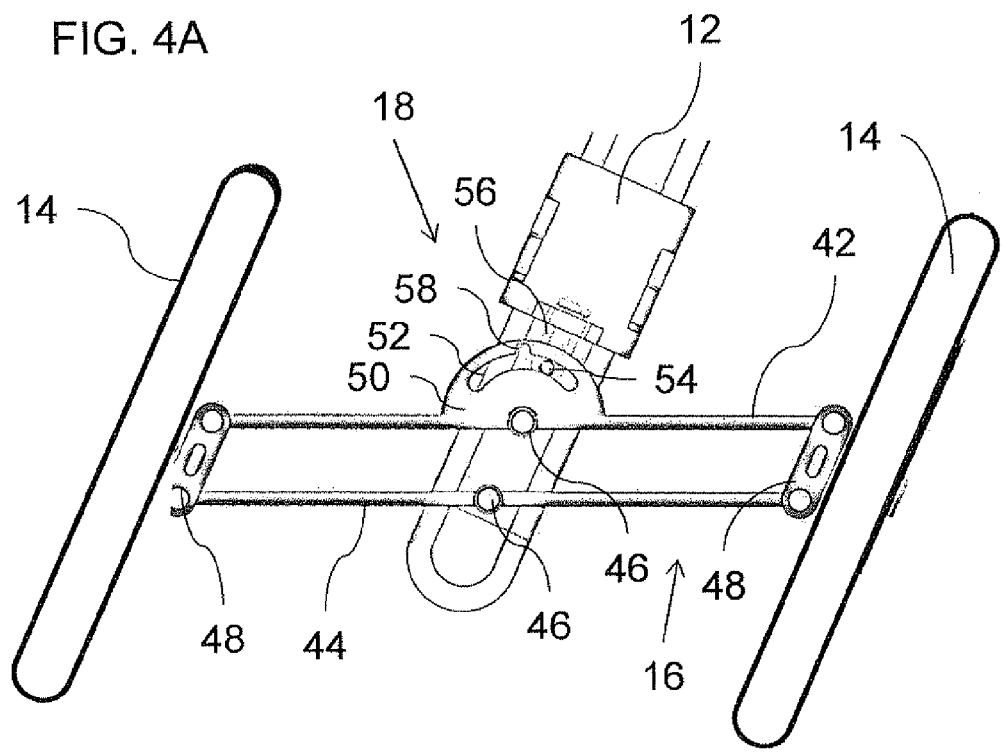
FIG. 4A is a schematic representation showing operation of a tilt mechanism of the cart of FIG. 1.
Figure 16A:
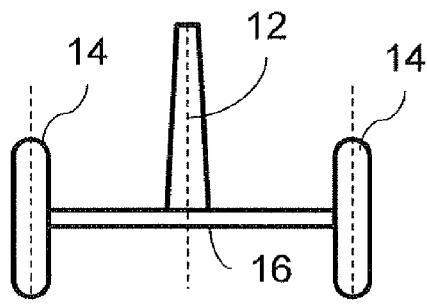
FIGS. 16A and 16B are schematic representations of the relative orientations of the cart body and the wheels during operation of the cart of FIG. 1, shown in an upright and a tilted state, respectively.
Figure 16B:
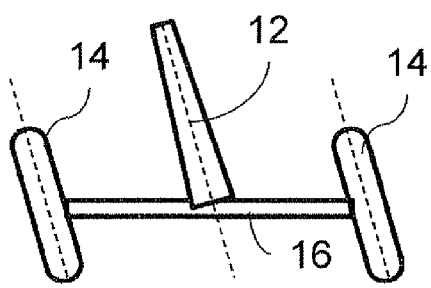

In the implementation shown here, tilt mechanism 16 is configured such that lateral tilting of cart body 12 generates a corresponding tilt of each of the wheels, and most preferably, an equal amount of tilt of each wheel, maintaining central planes of symmetry of cart body 12 and both wheels 14 parallel. A particularly simple and preferred mechanism for maintaining parallelism between the wheels and cart body is a parallelogram linkage linking between the cart body and the wheels. Two parallel bars 42 and 44 are each pivotally attached to cart body 12 at pivot points 46 at the mid-points of the bars. The ends of bars 42 and 44 are pivotally connected to the upper and lower ends, respectively, of short wheel-supporting linkages 48 which support short axles on which wheels 14 rotate. The hinges/pivots of each of wheel-support linkages 48 with bars 42 and 44 and with cart body 12 preferably form a parallelogram linkage which ensures that the degree of tilt of cart body 12 is reproduced at both wheels 14, as shown in FIGS. 4A, 16A and 16B.

Figure 17:
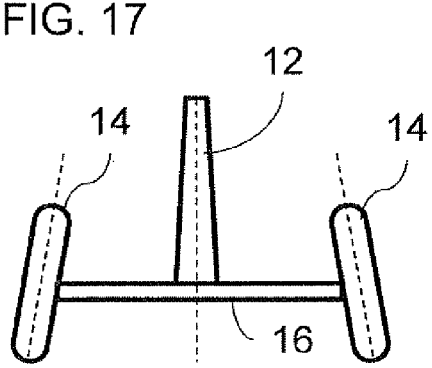
FIG. 17 is a schematic representation similar to FIG. 16A illustrating a variant wheel-tilt geometry.

Parenthetically, it should be noted that neither the parallelism of the wheels nor the equality of the tilting are essential to the broad concept of the present invention. Thus, for example, FIG. 17 illustrates schematically an alternative wheel geometry according to which wheels 14 are mounted with an inward inclination. This may be advantageous in certain cases for providing enhanced stability of the cart.

Figure 18:
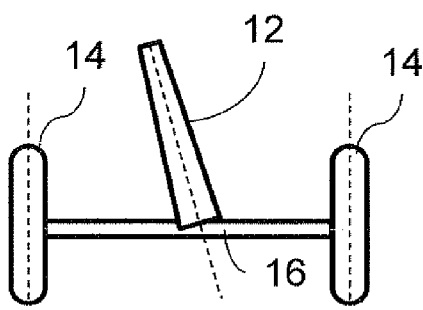
FIG. 18 is a schematic representation similar to FIG. 16B illustrating the operation of a variant implementation of the cart of the present invention.

FIG. 18 illustrates schematically an alternative tilt mechanism in which the geometry of wheels 14 is fixed, and only cart body 12 tilts relative to the underlying surface. This option is simple to implement, for example, employing a pivotal connection interconnecting between an otherwise rigid lower cart chassis and the cart body.

Figure 19:
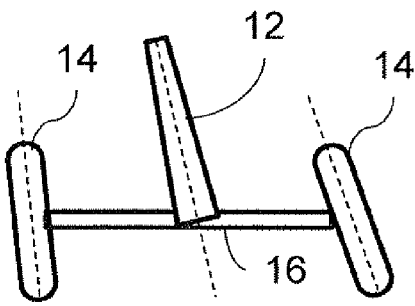
FIG. 19 is a schematic representation similar to FIG. 16B illustrating the operation of a further variant implementation of the cart of the present invention.

FIG. 19 illustrates schematically a further set of implementations according to which the degree of tilt of each wheel may be related to the tilt on the cart body by an arbitrary, typically linear, relation, thereby providing specific desired dynamic mechanical properties. A wide range of such options may be implemented by a person having ordinary skill in the art, for example, employing non-parallel geometry for a four-bar linkage. Design considerations for implementing various four-bar linkages are well known, and will not be detailed here.

In each design of tilt mechanism 16, a tilt lock 18 is preferably selectively deployable to lock tilting of cart body 12 relative to the underlying surface. The tilt lock may be a positive locking configuration, such as will be described below, or any other arrangement which allows tilting of tilt mechanism 16 while attached in the tricycle configuration but which effectively limits or eliminates such tilting when used as a stand-alone cart. In some cases, a spring mechanism providing sufficient biasing towards the upright position may serve as the "tilt lock", even in the absence of positive locking.

Figure 4B:
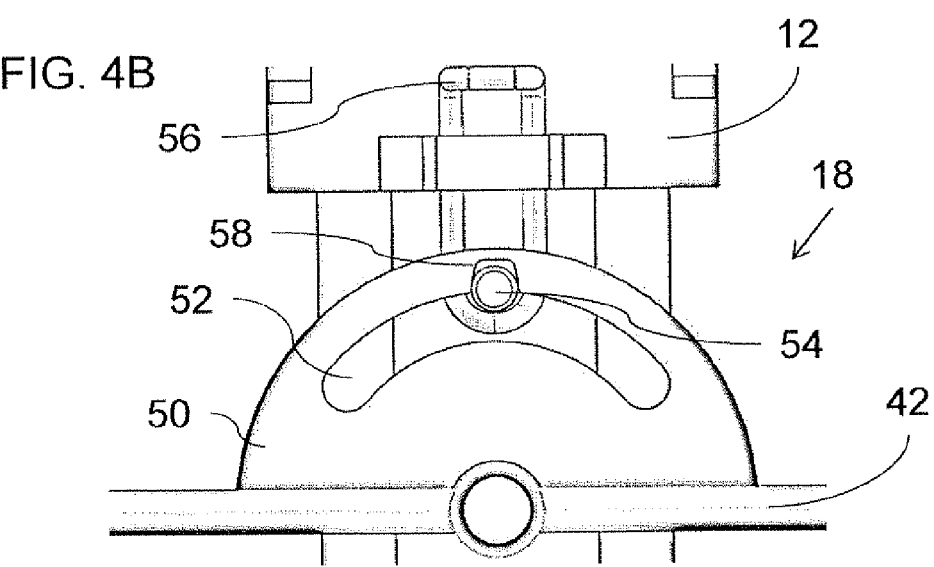
FIG. 4B is an enlarged view of a region of FIG. 4A illustrating a tilt lock deployed to lock tilting of a cart body.

In the preferred example illustrated in FIG. 4B, tilt lock 18 is implemented using a slot plate 50 fixed to bar 42. Slot plate 50 is formed with an arcuate slot 52 within which moves a locking pin 54 which is supported by a sliding clip 56 mounted on cart body 12. Arcuate slot 52 is formed with a central notch 58 into which locking pin 54 engages when sliding clip 56 is raised.

During operation as part of the tricycle configuration, sliding clip 56 is lowered so that locking pin 54 remains within the arcuate part of slot 52 thereby allowing tilting of tilt mechanism 16. When separated from the pedal-cycle frame, sliding clip 56 is raised so as to engage locking pin 54 in notch 58, thereby preventing tilting of cart body 12 relative to bar 42, and hence also relative to the underlying surface. Most preferably, sliding clip 56 is configured to interact with a part of the pedal-cycle frame or adapter during connection to the pedal-cycle frame, thereby automatically ensuring that the tilt mechanism is free to tilt when the tricycle configuration is assembled. Sliding clip 56 is preferably spring biased to a raised position so that locking of tilt mechanism 16 occurs automatically when the cart is separated from the pedal-cycle frame.

Turning now to FIGS. 5A-9, there is shown a preferred implementation of an adapter assembly 60 configured for attachment to a bicycle or scooter front fork 62 in place of a front wheel. Adapter assembly 60 cooperates with the connection features 20a and 20b of the cart body for releasable attachment of cart body 12 to the bicycle or scooter frame. For conciseness, the following description will refer to a bicycle frame, but is equally applicable to a scooter or other tilt-cornering vehicle with a front fork of a type normally receiving a single front wheel.

More specifically, adapter assembly 60 preferably includes a fork-end engagement 64 for attachment to a fork-end of bicycle front fork 62 and an arm 66 projecting from fork-end engagement 64. Arm 66 is preferably displaceable in an arcuate motion about the fork-end engagement which preferably performs one or both of two functions:

In a preferred implementations as illustrated here, arcuate motion of arm 66 preferably operates a clamping mechanism of the fork-end engagement 64 for selectively clamping and releasing connection features 20a, 20b of cart body 12 to provide quick clamping and release of cart 10 to the bicycle frame.

Figure 3B:
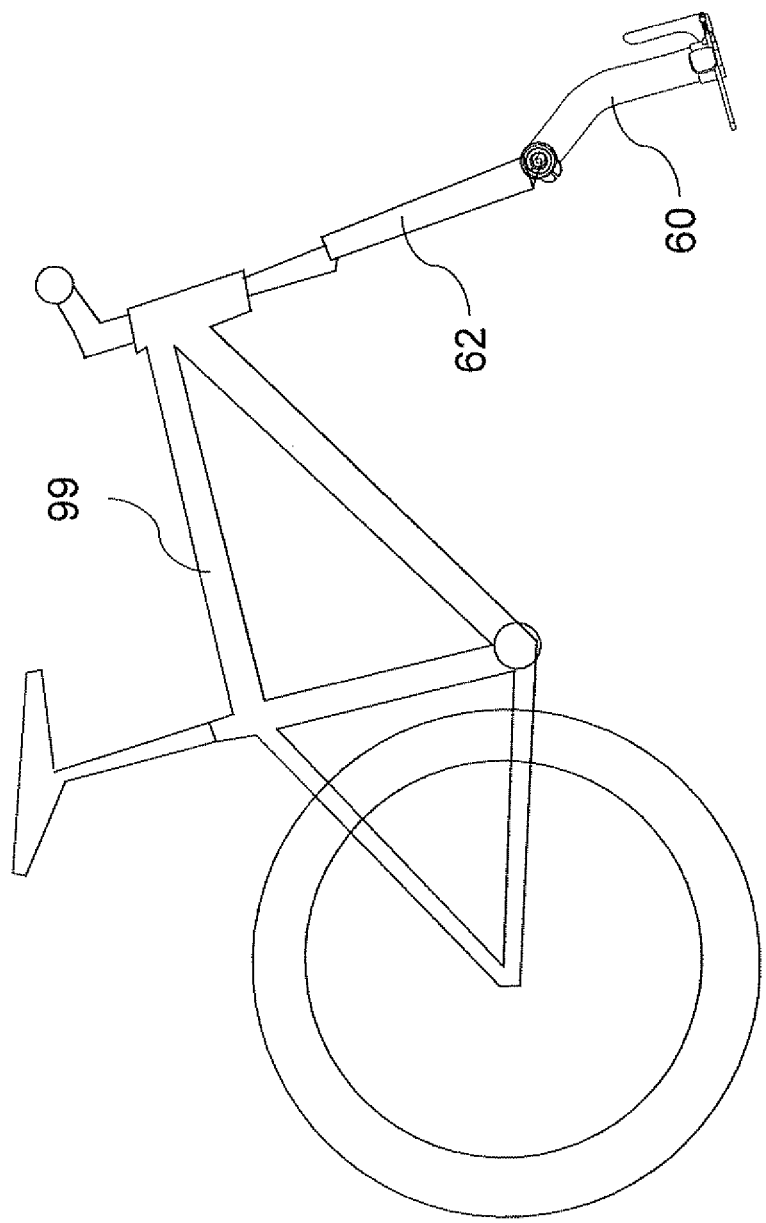
FIG. 3B is a schematic side view of the tilt-cornering vehicle of FIG. 2A after removal of the cart of FIG. 1.

Additionally, or alternatively, the rotated position of arm 66 preferably serves as a stand for supporting the bicycle front fork above the underlying surface, as illustrated in FIG. 3B.

Figure 6A:
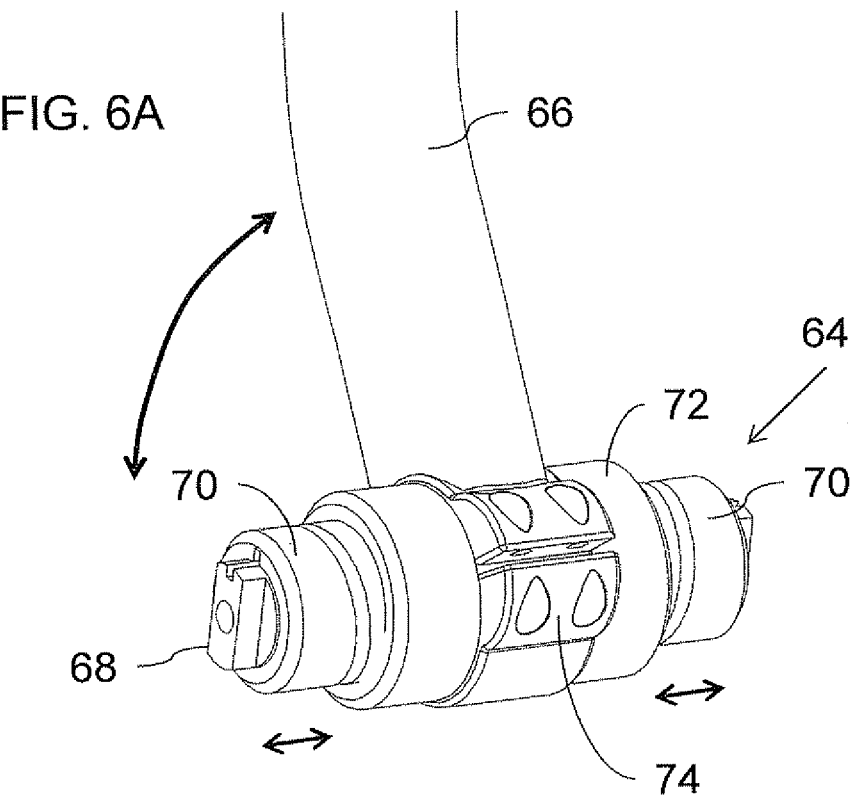
FIG. 6A is an enlarged isometric view of a fork-end engagement from the adapter of FIG. 5A including a clamping mechanism for fastening the cart to the tilt-cornering vehicle frame.
Figure 6B:
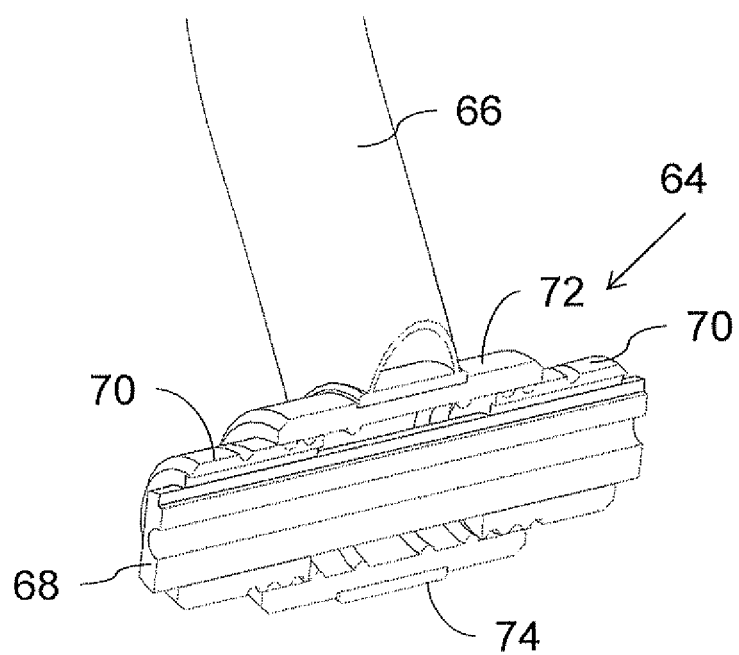
FIG. 6B is an isometric view similar to FIG. 6A cut away to show internal components of the clamping mechanism.

Structurally, as best seen in FIGS. 6A and 6B, fork end engagement assembly 64 includes a core element 68 which is configured for non-rotating attachment to the fork-end of front fork 62. In the example shown here, core element 68 has parallel-sided blocks at its ends for cooperating with a conventional "drop-out" wheel mounting. It will be appreciated that alternative core element designs suited for other convention types of wheel mounting may readily be substituted.

Figure 7:
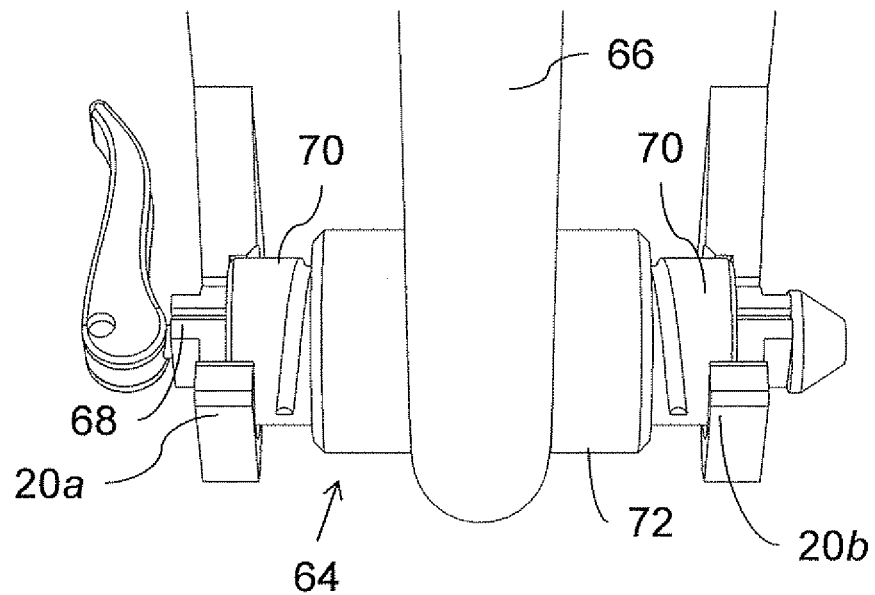
FIG. 7 is a rear view illustrating fastening of connection features of the cart of FIG. 1 by the clamping mechanism of the fork engagement of FIG. 6A, with the tilt-cornering vehicle frame omitted for clarity.

Located around core element 68 are two axially-displaceable clamping sleeves 70 which move axially outwards to engage complementary sockets in connection features 20a, 20b, as seen in FIGS. 1 and 7, and which are retractable axially inwards to release clamping of the cart. Clamping sleeves 70 are free to slide along core element 68, but are locked against rotation relative to core element 68 by a pin-in-slot engagement.

External surfaces of clamping sleeves 70 are provided with threaded engagement features which mate with corresponding features of an outer casing 72. The threaded engagement features for one clamping sleeve are a normal (right-handed) thread while the other is a reverse (left-handed) thread, such that rotation of outer casing 72 in one direction forces apart the two clamping sleeves 70 towards their clamping positions and rotation in the reverse direction draws clamping sleeves 70 together to release clamping. Arm 66 is fixed to outer casing 72 by a collar 74 which can be loosened during initial adjustment of the adapter to ensure that the clamping state of engagement assembly 64 is reached when arm 66 is in a raised position, adjacent to and generally aligned with front fork 62, as seen in FIGS. 5B and 9.

Figure 8:
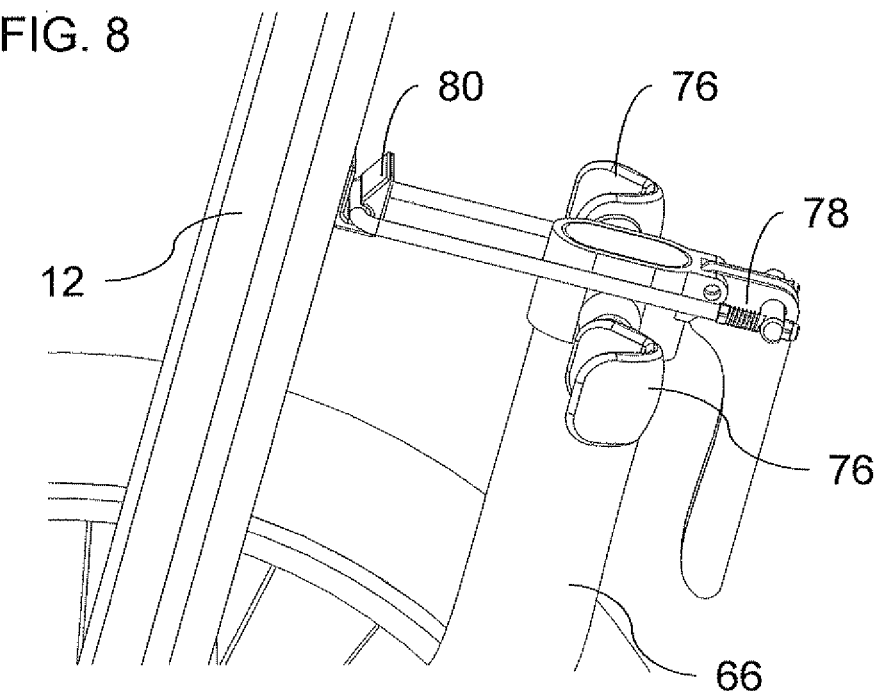
FIG. 8 is a side view of an upper end of the adapter of FIG. 5A showing operation of a secondary clamping mechanism for clamping the cart of FIG. 1 to the tilt-cornering vehicle frame, but with the tilt-cornering vehicle frame omitted for clarity.

An upper end of arm 66 preferably includes at least part of a secondary clamping mechanism configured such that, when the arm assumes a raised position adjacent to the bicycle front fork, the secondary clamping mechanism clamps the cart body to the bicycle front fork. In the preferred example shown here, as best seen in FIGS. 8 and 9, the secondary clamping mechanism includes a pair of abutment brackets 76 which abut the two sides of the bicycle frame front fork 62 (omitted from FIGS. 7 and 8 for clarity), and a geometrically locking tension clamp mechanism 78 which engages a hook 80 on cart body 12 and pulls it tight towards front fork 62.

In use, when arm 66 is rotated to its full extent downwards, it serves as a stand for front fork 62 as illustrated in FIG. 3B, maintaining the height of the front fork roughly as required for connection to cart 10. When it is desired to attach cart 10 to the pedal-cycle frame, cart body 12 is positioned with engagement features 20a and 20b on either side of front-fork engagement assembly 64, and arm 66 is rotated backwards and upwards, thereby actuating outward motion of clamping sleeves 70 so as to clamp cart body 12 to front fork 62. At the end of the arm motion, abutment brackets 76 abut front fork 62 and clamp mechanism 78 is used to engage hook 80 and tighten cart body 12 against front fork 62, completing attachment of cart 10 to form the tricycle configuration. Optionally, a security lock (not shown) may be provided to prevent unauthorized release of cart 10 from the tilt-cornering vehicle, so that the tricycle can be secured as a unit against theft.

As mentioned earlier, sliding clip 56 is preferably positioned and configured such that it is depressed by contact with adapter 60 during connection of the cart, thereby ensuring that tilt mechanism 16 is free to tilt when the tricycle configuration is assembled.

Detachment of cart 10 from the tricycle configuration is performed similarly in reverse: release of clamp mechanism 78; and rotating arm 66 to its lowered position releases cart 10 and positions arm 66 correctly to serve as a stand. The aforementioned spring bias of sliding clip 56 ensures that detachment of cart body 12 from adapter 60 is effective to return tilt lock 18 to a locked state.

Parenthetically, it should be noted that cart 10 when used with adapter 60 preferably maintains the height and wheelbase of the original bicycle or scooter. Where wheels 14 are smaller than the original single wheel of a bicycle (represented by a dashed circle in FIG. 3A), the geometry of attachment of cart 10 via adapter 60 preferably positions the axles of wheels 14 below the end of the front fork of the bicycle frame so that the point of ground contact is roughly the same as for the larger wheel which they replace.

Figure 11:
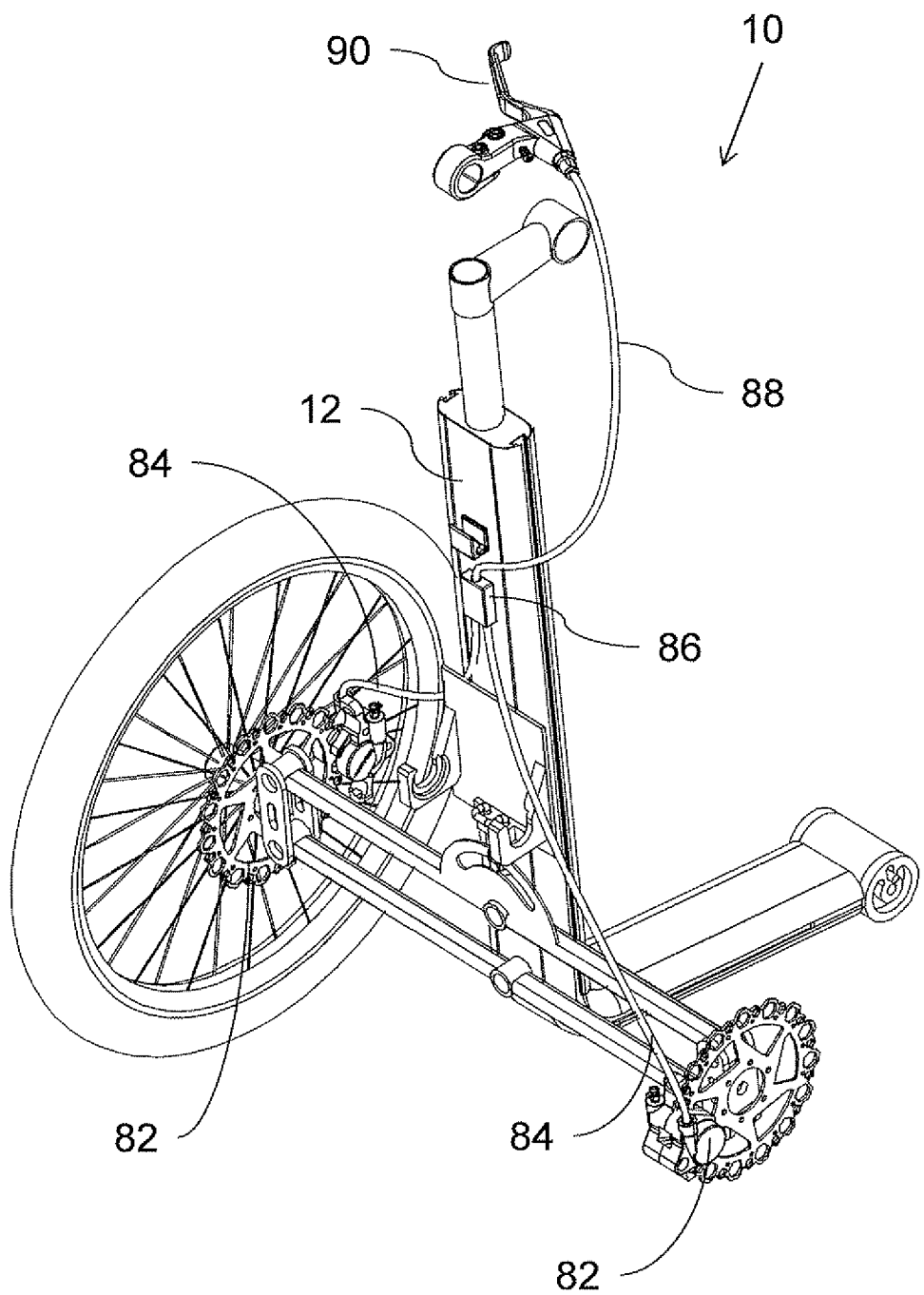
FIG. 11 is a partial view of the cart of FIG. 1 illustrating an implementation of a brake system in accordance with an embodiment of the invention.

FIG. 11 illustrates an exemplary, non-limiting option for implementation of a brake arrangement for cart 10, which is omitted from the other drawings for clarity of presentation. The brake arrangement illustrated here includes a disc-brake arrangement 82 associated with each wheel 14. Actuator cables 84 for each disc-brake are connected to a splitter 86 so as to be operated by a single common actuator cable 88 by operation of a brake lever 90. According to one option, brake lever 90 may have a quick clamping mechanism (not shown), and may be transferred from the cart handle to the pedal-cycle handlebar when the cart is connected to the pedal-cycle. Alternatively, brake lever 90 is the permanently installed lever on the handlebar, and a rapid-connect connector (not shown) is provided in common actuator cable 88 to allow connection and disconnection of the brake cable during attachment and removal of cart 10. In the latter case, a second brake lever is preferably permanently connected to the cart to provide braking in the stand-alone state.

FIGS. 12A and 12B, already addressed above, relate to a variant embodiment of a cart, generally designated 100, which illustrates a kick-stand 38 and a load supporting frame 24, but is otherwise structurally and functionally equivalent to cart 10 described above.

Figure 13:
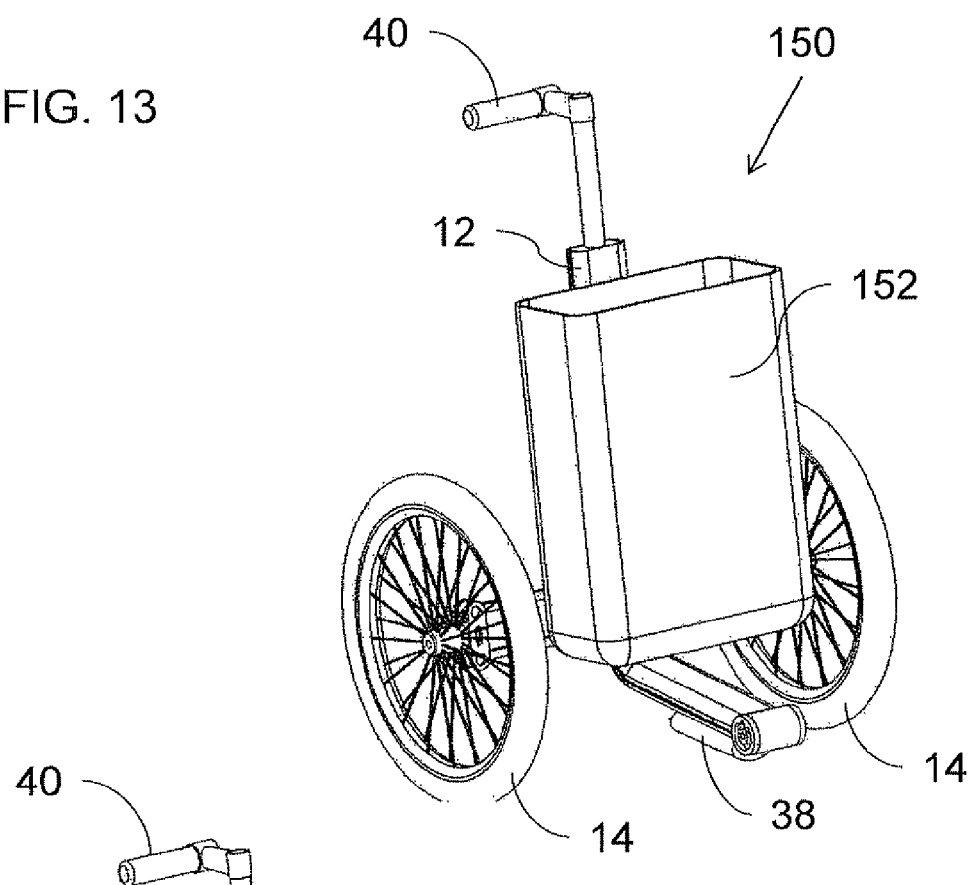
FIG. 13 is an isometric view of a variant of the cart of FIG. 1 illustrating the cart with a shopping basket.

FIG. 13 shows a further variant of the present invention implemented as a shopping cart 150 in which a shopping basket 152 is mounted to cart frame 12. In other respects, this embodiment is similar in structure and function to the embodiments described above.

Figure 14:
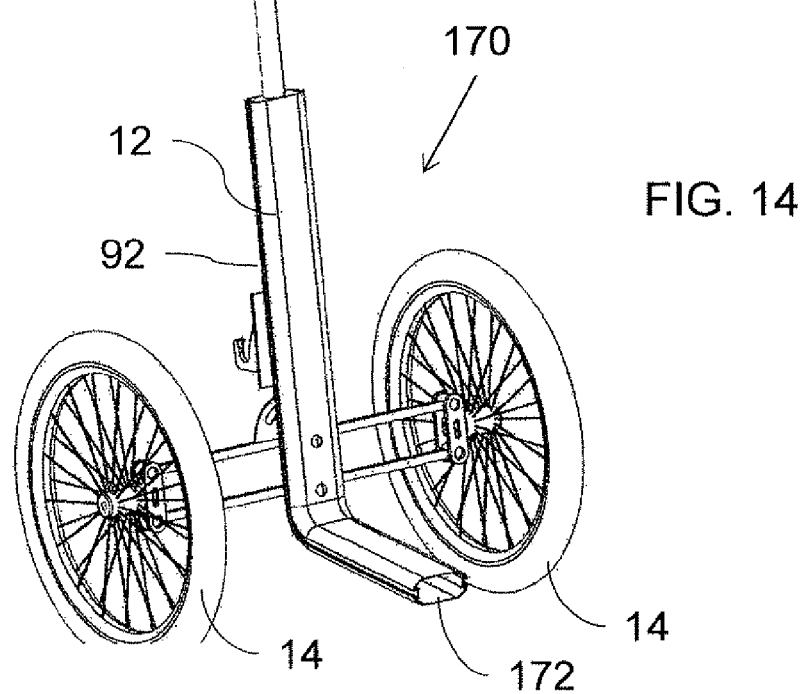
FIG. 14 is an isometric view of a basic version of a cart according to the present invention which forms the basis for the various embodiments described above and additional embodiments.

It will be noted that the various embodiments described herein are most preferably implemented as modular accessories which can be added to a basic cart embodiment. This basic embodiment is illustrated in FIG. 14 as cart 170. The modular accessories are preferably mounted via T-shape slots 92 and/or via a socket 172 provided by the hollow profile of cart body 12.

Figure 15A:
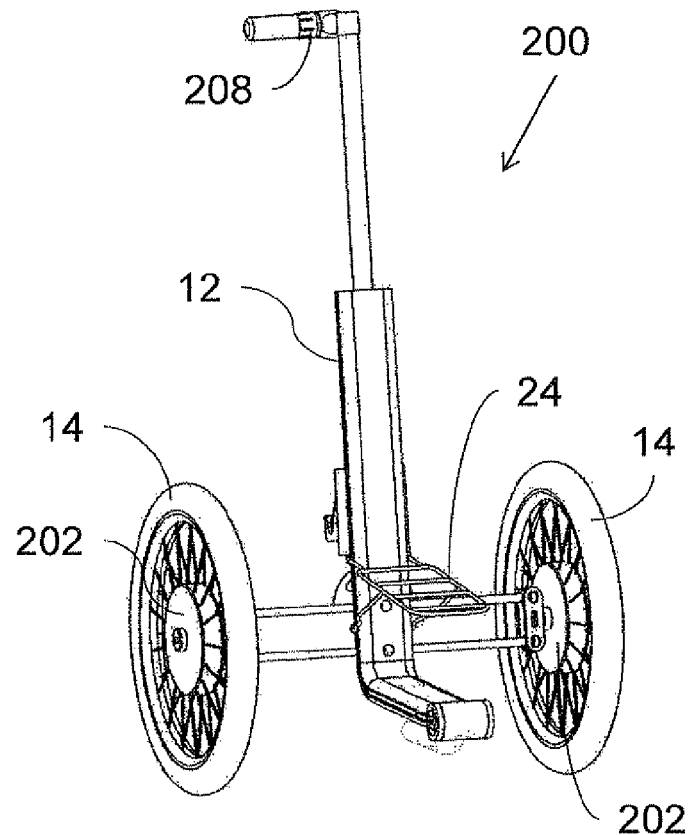
FIGS. 15A and 15B are isometric views of a further variant of the cart of FIG. 1 including an electric power drive.
Figure 15B:
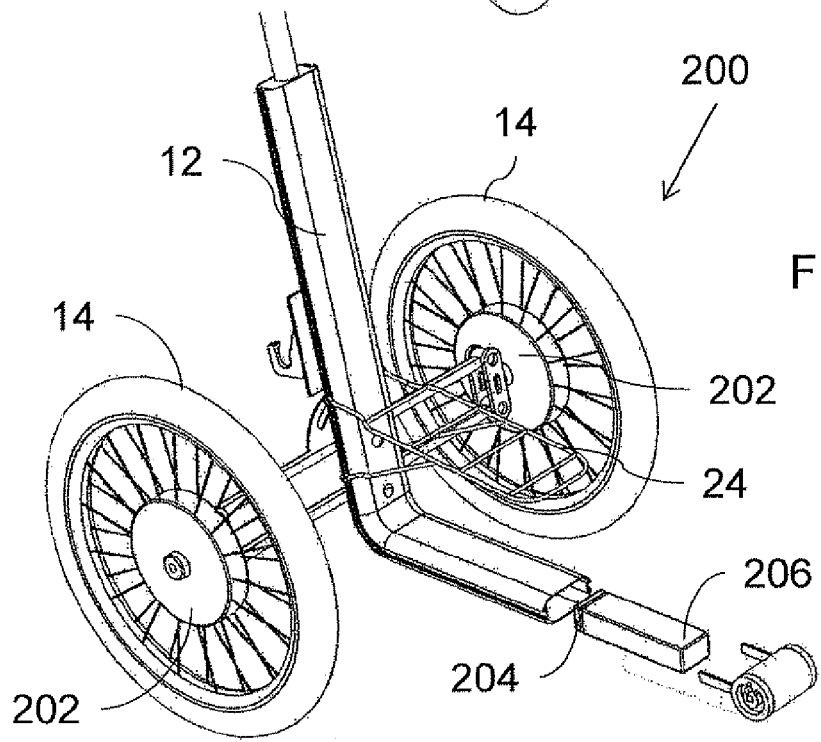

Turning finally to FIGS. 15A and 15B, this illustrates a further variant of a cart, generally designated 200, constructed and operative according to an embodiment of the present invention. Cart 200 is generally similar in structure and function to cart 10 described above, but differs in that cart 200 is provided with an electric drive system to provide a powered, or power-assisted, ride. In the implementation illustrated here, each wheel 14 is provided with a hub motor 202 for driving rotation of the wheel. A battery pack 204 and a controller 206 are shown here incorporated into cart body 12, and a speed control or "throttle" 208 is added to handle 40.

When connected in the tricycle configuration, the electric drive is preferably controlled either by a speed control or throttle mounted on the pedal-cycle handlebar, or via torque sensors deployed to sense the torque applied to the pedals. Integration with these control elements on the pedal-cycle frame is advantageously achieved by wireless communication, thereby avoiding the need for additional electric or manual connectors during attachment of cart 200 to the pedal-cycle frame.

The electric drive system preferably allows for electric propulsion with or without the pedal-cycle frame, and effectively allows conversion of an ordinary bicycle (or scooter) to an electrically powered or hybrid (power assisted) tricycle with minimal modification of the bicycle structure. Since electric propulsion system remains as part of the cart when detached from the bicycle, the electric propulsion system is less at risk of theft, and it allows electric propulsion of the cart when desired.

In all other respects, the structure and function of cart 200 is fully analogous to that of cart 10 described above.

It will be appreciated that the above descriptions are intended only to serve as examples, and that many other embodiments are possible within the scope of the present invention as defined in the appended claims.

What is claimed is:

1. A cart for supporting a load above an underlying surface, the cart being interchangeably usable as a front-wheel replacement for attachment to a front fork of a tilt-cornering vehicle and as a cart separate from the tilt-cornering vehicle, the cart comprising:
    (a) a cart body configured for supporting the load;
    (b) a pair of wheels deployed on opposing sides of said cart body;
    (c) an adapter configured for releasably attaching said cart body to the front fork of the tilt-cornering vehicle such that said pair of wheels function as front wheels for the tilt-cornering vehicle, said adapter allowing release of said cart body from the front fork of the tilt-cornering vehicle for use of said cart body as a cart separate from the tilt-cornering vehicle;
    (d) a tilt mechanism linking between said cart body and said wheels so as to transfer the load on the cart body through said wheels to the underlying surface, said tilt mechanism allowing lateral tilting of said cart body relative to the underlying surface for tilting together with the tilt-cornering vehicle; and
    (e) a tilt lock associated with said tilt mechanism and selectively deployable to lock tilting of said cart body relative to the underlying surface so as to prevent lateral tilting of said cart body while being used as a cart separate from the tilt-cornering vehicle.

2. The cart of claim 1, wherein said tilt mechanism is configured such that lateral tilting of said cart body generates a corresponding tilt of each of said wheels.

3. The cart of claim 1, wherein said tilt mechanism comprises a parallelogram linkage linking between said cart body and said wheels.

4. The cart of claim 1, further comprising a third wheel deployable to support the cart together with said pair of wheels as a free-standing cart.

5. The cart of claim 4, wherein said third wheel is supported relative to said cart body by a retraction mechanism, said retraction mechanism being selectively deployable between a deployed state in which said third wheel supports the cart together with said pair of wheels as a free-standing cart and a retracted state in which said third wheel is removed from the underlying surface for use of the cart attached to a tilt-cornering vehicle.

6. The cart of claim 1, further comprising a selectively deployable stand selectively deployable to an extended position in which said stand supports the cart together with said pair of wheels as a free-standing cart.

7. The cart of claim 1, wherein said cart body comprises a modular mounting arrangement configured for supporting any one of a plurality of accessories.

8. The cart of claim 7, wherein said plurality of accessories include at least one accessory selected from the group comprising: a child seat; a seat for a physically handicapped person; a shopping basket; a luggage rack; and a container.

9. The cart of claim 7, wherein said mounting arrangement allows continuous adjustment of a height of attachment of said accessories.

10. The cart of claim 1, wherein said cart body further comprises a retractable handle selectively deployable to allow pushing of the cart as a free-standing cart.

11. The cart of claim 1, wherein said adapter and said tilt lock are configured such that attachment of said cart body to said adapter is effective to deploy said tilt lock from a locked state to an unlocked state, and detachment of said cart body from said adapter is effective to return said tilt lock to a locked state.

12. The cart of claim 1, wherein said adapter comprises:
(a) a fork-end engagement for attachment to a fork-end of the front fork; and
(b) an arm projecting from said fork-end engagement, said arm being displaceable in an arcuate motion about said fork-end engagement.

13. The cart of claim 12, wherein said arcuate motion of said arm operates a clamping mechanism of said fork-end engagement for selectively clamping and releasing said connection features of said cart body.

14. The cart of claim 12, wherein an end of said arm includes at least part of a secondary clamping mechanism configured such that, when said arm assumes a raised position adjacent to the front fork, said secondary clamping mechanism clamps said cart body to the front fork.

15. The cart of claim 12, wherein, in a lowered position of said arm, said adapter is configured to serves as a stand for supporting the front fork above the underlying surface.

16. A vehicle with a separable cart comprising:
(a) a tilt-cornering vehicle having a frame, a rear wheel, and a steerable front fork; and
(b) a cart according to claim 1 releasably attachable to said steerable front fork by said adapter,
wherein attachment of said cart to said tilt-cornering vehicle is solely via said steerable front fork without connection to said frame.

* * * * *